(12) United States Patent
Chen et al.

(10) Patent No.: US 12,080,197 B2
(45) Date of Patent: Sep. 3, 2024

(54) SUPPORTING BACKPLANE AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Zuquan Chen, Beijing (CN); Wei Qing, Beijing (CN); Xingguo Liu, Beijing (CN); Shaokui Liu, Beijing (CN); Zhihui Wang, Beijing (CN); Wei Zeng, Beijing (CN); Danping Shen, Beijing (CN); Qiang Tang, Beijing (CN); Ce Wang, Beijing (CN)

(73) Assignees: CHENDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 237 days.

(21) Appl. No.: 17/763,398

(22) PCT Filed: May 26, 2021

(86) PCT No.: PCT/CN2021/096154
§ 371 (c)(1),
(2) Date: Mar. 24, 2022

(87) PCT Pub. No.: WO2021/239003
PCT Pub. Date: Dec. 2, 2021

(65) Prior Publication Data
US 2022/0343809 A1    Oct. 27, 2022

(30) Foreign Application Priority Data
May 29, 2020 (CN) .......................... 202020952904.5

(51) Int. Cl.
*G09F 9/30* (2006.01)
*G06F 1/16* (2006.01)

(52) U.S. Cl.
CPC ............ *G09F 9/301* (2013.01); *G06F 1/1601* (2013.01); *G06F 1/1652* (2013.01)

(58) Field of Classification Search
CPC ..................................................... G09F 9/301
See application file for complete search history.

(56) References Cited

U.S. PATENT DOCUMENTS 9,120,290 B2 * 9/2015 Krall ...................... G06F 1/1679
10,074,824 B2 * 9/2018 Han ....................... G06F 1/1652
(Continued)

FOREIGN PATENT DOCUMENTS

CN    110660325 A    1/2020
CN    110895901 A    3/2020
(Continued)

OTHER PUBLICATIONS

International Search Report from PCT/CN2021/096154 dated Aug. 18, 2021.
Written Opinion from PCT/CN2021/096154 dated Aug. 18, 2021.

*Primary Examiner* — Lisa Lea-Edmonds
(74) *Attorney, Agent, or Firm* — Calfee, Halter & Griswold LLP (57) ABSTRACT

Provided are a supporting backplane and a display apparatus. The supporting backplane is arranged at one side of a flexible display panel, and the supporting backplane at least comprises a main bending area, wherein a bending axis corresponding to the main bending area extends in a first direction; the main bending area is provided with a plurality of first hollow holes, the plurality of first hollow holes being arranged in an array in the first direction and a second direction, which is orthogonal to the first direction; each of the first hollow holes is provided with a first middle hole (Continued)

area, and first arc-shaped hole areas located at two sides of the first middle hole area in the first direction.

15 Claims, 8 Drawing Sheets

(56) References Cited

U.S. PATENT DOCUMENTS

| | | | | |
|---|---|---|---|---|
| 10,164,208 | B2* | 12/2018 | Lee | ............ B32B 15/04 |
| 10,194,543 | B2* | 1/2019 | Seo | ........... G06F 1/1626 |
| 10,368,452 | B2* | 7/2019 | Yun | ............ H10K 77/111 |
| 10,516,119 | B2* | 12/2019 | Lee | ............ H10K 50/8445 |
| 10,558,242 | B2* | 2/2020 | Kim | ............ G06F 1/1681 |
| 10,789,863 | B2* | 9/2020 | Song | ............ H05K 1/189 |
| 10,798,831 | B2* | 10/2020 | Shin | ............ H05K 3/284 |
| 10,847,066 | B2 | 11/2020 | Lee et al. | |
| 11,469,386 | B2* | 10/2022 | Min | ............ H10K 77/111 |
| 11,513,560 | B2* | 11/2022 | Dong | ............ B32B 9/04 |
| 11,605,796 | B2* | 3/2023 | Kim | ............ G06F 1/1616 |
| 11,841,746 | B2* | 12/2023 | Kang | ............ G09F 9/30 |
| 2017/0194580 | A1 | 7/2017 | Lee | |
| 2020/0084897 | A1 | 3/2020 | Shin et al. | |
| 2020/0093011 | A1 | 3/2020 | Lee et al. | |
| 2020/0135065 | A1 | 4/2020 | Song | |
| 2021/0012688 | A1 | 1/2021 | Lee et al. | |
| 2021/0153363 | A1* | 5/2021 | Cao | ............ H05K 5/0017 |
| 2021/0165454 | A1* | 6/2021 | Dong | ............ G06F 1/1652 |
| 2021/0325929 | A1* | 10/2021 | Cai | ............ B32B 3/04 |
| 2021/0382367 | A1* | 12/2021 | Hashimoto | ............ G02F 1/1677 |
| 2022/0223806 | A1* | 7/2022 | Ostholt | ............ C03C 15/00 |
| 2022/0343809 | A1* | 10/2022 | Chen | ............ G09F 9/301 |
| 2023/0114378 | A1* | 4/2023 | Han | ............ G09F 9/301 |
| | | | | 361/679.27 |
| 2023/0154360 | A1* | 5/2023 | Zhao | ............ G06F 1/1652 |
| 2023/0156934 | A1* | 5/2023 | Jiang | ............ H05K 5/0217 |
| | | | | 361/807 |

FOREIGN PATENT DOCUMENTS

| | | |
|---|---|---|
| CN | 110910761 A | 3/2020 |
| CN | 111091760 A | 5/2020 |
| CN | 211928943 U | 11/2020 |
| EP | 3591497 A1 | 1/2020 |
| GB | 2577401 A | 3/2020 |
| GB | 2577401 B | 12/2020 |
| GB | 2587698 A | 4/2021 |

\* cited by examiner

SUPPORTING BACKPLANE AND DISPLAY APPARATUS

CROSS REFERENCE

The present disclosure is a U.S. National Stage of International Application No. PCT/CN2021/096154, filed on May 26, 2021, which claims priority to Chinese Patent Application No. 202020952904.5, filed on May 29, 2020, entitled "Supporting Backplane and Display Apparatus", both the entire contents of which are incorporated herein by reference in its entirety.

TECHNICAL FIELD

The present disclosure relates to the field of display technology, and in particular, to a supporting backplane and a display apparatus.

BACKGROUND

With the development of display technology, flexible display panels that are foldable, stretchable and rollable or the like have gradually entered the attention of consumers. In order to facilitate bending or recovery of the flexible display panel, it is necessary to make the flexible display panel lighter and thinner.

However, as the flexible display panel becomes thinner and lighter, the overall bending resistance and impact resistance performance are poor, the reliability and stability of the product are reduced.

It should be noted that the information disclosed in the Background section is only for enhancement of understanding of the background of the present disclosure, and therefore may contain information that does not form information the prior art that is already known to a person of ordinary skill in the art.

SUMMARY

According to a first aspect of the present disclosure, there is provided a supporting backplane, disposed on a side of a flexible display panel, the supporting backplane at least including a main bending area, and a bending axis corresponding to the main bending area extending in a first direction; and the main bending area being provided with a plurality of first hollow holes, and the plurality of first hollow holes being arranged in an array in the first direction and in a second direction orthogonal to the first direction; and each of the first hollow holes having a first middle hole area and first arc-shaped hole areas located at two sides of the first middle hole area in the first direction;

wherein, along a direction from positions where the first middle hole area is connected to the first arc-shaped hole areas to a central position of the first middle hole area, a size of the first middle hole area gradually decreases in the second direction, the second direction is orthogonal to the first direction.

In an example embodiment of the present disclosure, two opposite contour lines of the first middle hole area in the second direction are arc-shaped; and the first arc-shaped hole area is a semicircular hole area;

wherein, the first hollow hole is symmetrically arranged with respect to its center line in the first direction.

In an example embodiment of the present disclosure, adjacent first hollow holes in the second direction are arranged in a staggered manner.

In an example embodiment of the present disclosure, a diameter of the first arc-shaped hole area is 0.1 mm to 0.4 mm;

a size of the first middle hole area in the first direction is 2 mm to 7 mm, a maximum size of the first middle hole area in the second direction is identical with the diameter of the first arc-shaped hole area, a minimum size of the first middle hole area in the second direction is 0.05 mm to 0.35 mm, and a curvature radius of the arc-shaped contour line of the first middle hole area is 10 mm to 50 mm.

In an example embodiment of the present disclosure, a distance between adjacent first hollow holes in the first direction is 0.05 mm to 0.3 mm;

a stagger size between the adjacent first hollow holes in the second direction is 1 mm to 4 mm;

a distance between center lines of the adjacent first hollow holes in the second direction is 0.2 mm to 0.5 mm.

In an example embodiment of the present disclosure, the supporting backplane further includes transition bending areas located at opposite two sides of the main bending area in the second direction, the transition bending area is provided with a plurality of hollow holes;

wherein, a ratio between a total area of the plurality of hollow holes in the transition bending area and a total area of the transition bending area is smaller than a ratio between a total area of the plurality of first hollow holes in the main bending area and a total area of the main bending area.

In an example embodiment of the present disclosure, the plurality of hollow holes in the transition bending area at least include a second hollow hole, a plurality of the second hollow holes are provided, the plurality of second hollow holes are arranged in an array in the first direction and the second direction, and adjacent second hollow holes in the second direction are arranged in a staggered manner;

wherein, the second hollow hole has a second middle hole area and second arc-shaped hole areas located at two sides of the second middle hole area in the first direction; shapes and sizes of the second arc-shaped hole areas are identical with shapes and sizes of the first arc-shaped hole areas; a shape of the second middle hole area is rectangular, or two opposite contour lines of the second middle hole area in the second direction are arc-shaped; and a size of the second middle hole area in the first direction is smaller than a size of the first middle hole area in the first direction.

In an example embodiment of the present disclosure, the plurality of hollow holes in the transition bending area further include a third hollow hole, and the third hollow hole is located between adjacent second hollow holes in the first direction, wherein the third hollow hole is a circular hole, and a diameter of the third hollow hole is identical with a diameter of the first arc-shaped hole area.

According to a second aspect of the present disclosure, there is provided a display apparatus including: a flexible display panel and any of the supporting backplanes described above, wherein the supporting backplane is disposed on a side of the flexible display panel.

In an example embodiment of the present disclosure, the display apparatus further includes a foam rubber layer, wherein the foam rubber layer is adhered between the supporting backplane and the flexible display panel.

It should be noted that the above general description and the following detailed description are merely exemplary and exemplary and should not be construed as limiting of the present disclosure.

BRIEF DESCRIPTION OF THE DRAWINGS

The accompanying drawings, which are incorporated in and constitute a part of this specification, illustrate embodiments consistent with the disclosure and serve to explain the principles of the disclosure together with the description. The drawings in the following description are only some embodiments of the present disclosure, and for those of ordinary skill in the art, other drawings can also be obtained from these drawings without creative effort.

DETAILED DESCRIPTION

Example embodiments will now be described more fully with reference to the accompanying drawings. Example embodiments, however, can be embodied in various forms and should not be construed as limited to the embodiments set forth herein; rather, these embodiments are provided so that this disclosure will be thorough and complete, and will fully convey the concept of example embodiments to those skilled in the art. The same reference numerals in the drawings denote the same or similar structures, and thus their detailed descriptions will be omitted.

Although relative terms such as "on" and "under" are used in this specification to describe the relative relationship of one component of an icon to another component, these terms are used in this specification only for convenience, such as according to the directions of the examples in the accompanying drawings. It will be appreciated that if the device of the icon is turned upside down, the components described as "on" will become the components described as "under". When a certain structure is "on" other structures, it may mean that a certain structure is integrally formed on other structures, or that a certain structure is "directly" arranged on other structures, or that a certain structure is "indirectly" arranged on another structure through another structure.

The terms "a", "an", "the", "said" and "at least one" are used to indicate the presence of one or more elements/components/etc.; the terms "including" and "having" are used to indicate an open-ended inclusive meaning and means that additional elements/components/etc. may be present in addition to the listed elements/components/etc.

Flexible display products are a new generation of display technologies that are developing rapidly and can be adapted to various application scenarios. Lightweight and flexibility (such as large-angle bending and curling) bring consumers better experience, but also face a series of problems.

Figure 1:
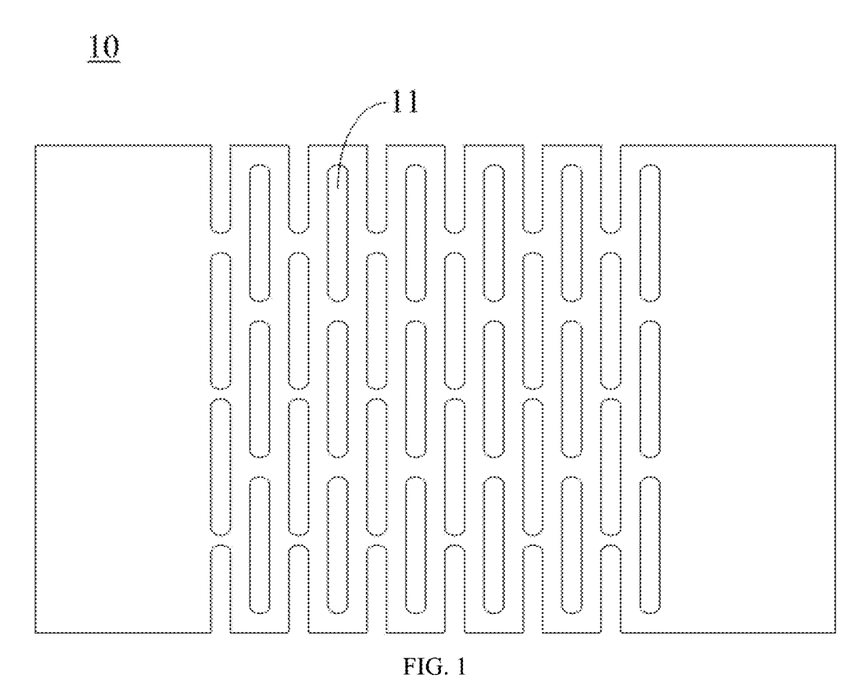
FIG. 1 is a schematic structural diagram of a supporting backplane shown in the related art.
Figure 2:
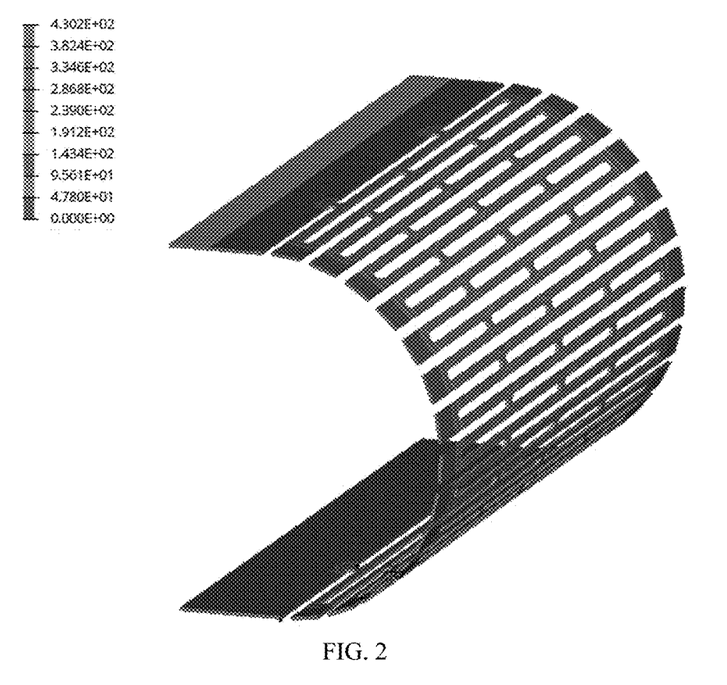
FIG. 2 is a stress cloud diagram of the supporting backplane shown in the related art when it is bent.

Flexible display products need to withstand a large number of bending conditions, especially in high frequency (100,000 times) bending, the supporting backplane often suffers fatigue damage due to large alternating stress. The design idea in the related art is that, as shown in FIG. 1, the bending area of the supporting backplane 10 is etched to form an elongated hole 11 with two circular-arc ends and a rectangle in the middle, so as to reduce its bending resistance performance, and reduce the maximum stress during bending, so that the fatigue resistance performance of the supporting backplane 10 can meet requirements. FIG. 2 shows a stress cloud diagram of the supporting backplane 10 shown in the related art when it is bent, and the maximum stress in FIG. 2 is 430.2 MPa. However, as for higher fatigue requirements, there is still room for improvement in the bending times of the supporting backplane.

Figure 3:
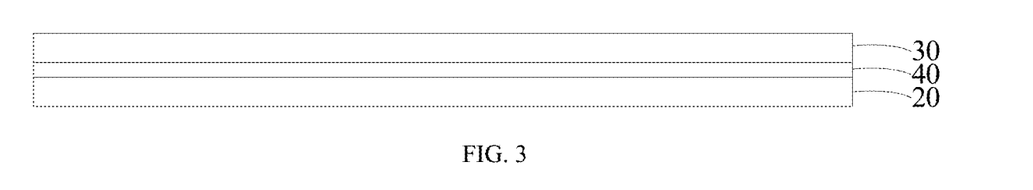
FIG. 3 is a side structural view of a display apparatus having a supporting backplane, a flexible display panel and a foam rubber layer according to an embodiment of the disclosure.
Figure 4:
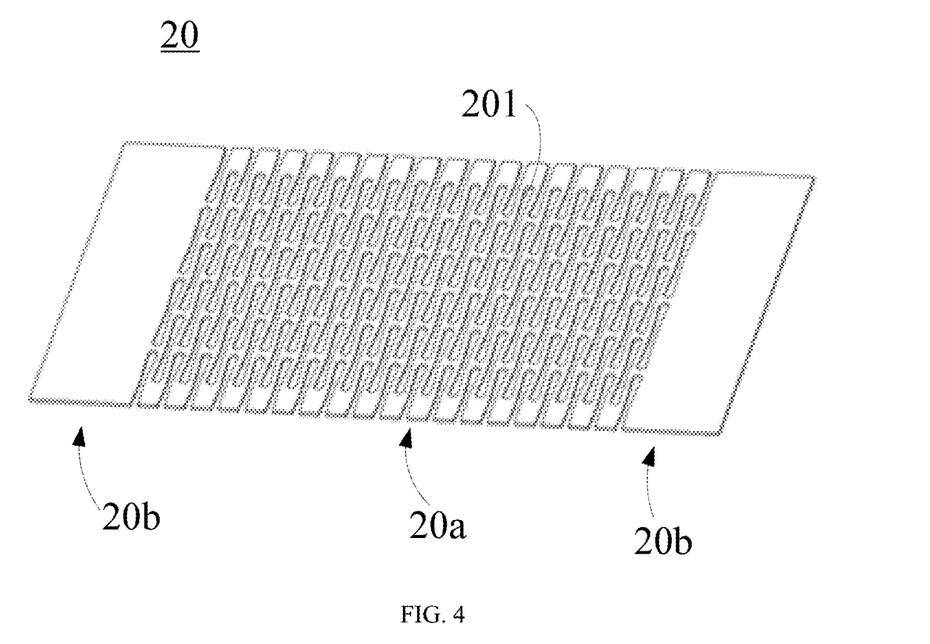
FIG. 4 is a schematic three-dimensional structural diagram of a supporting backplane according to an embodiment of the disclosure.
Figure 5:
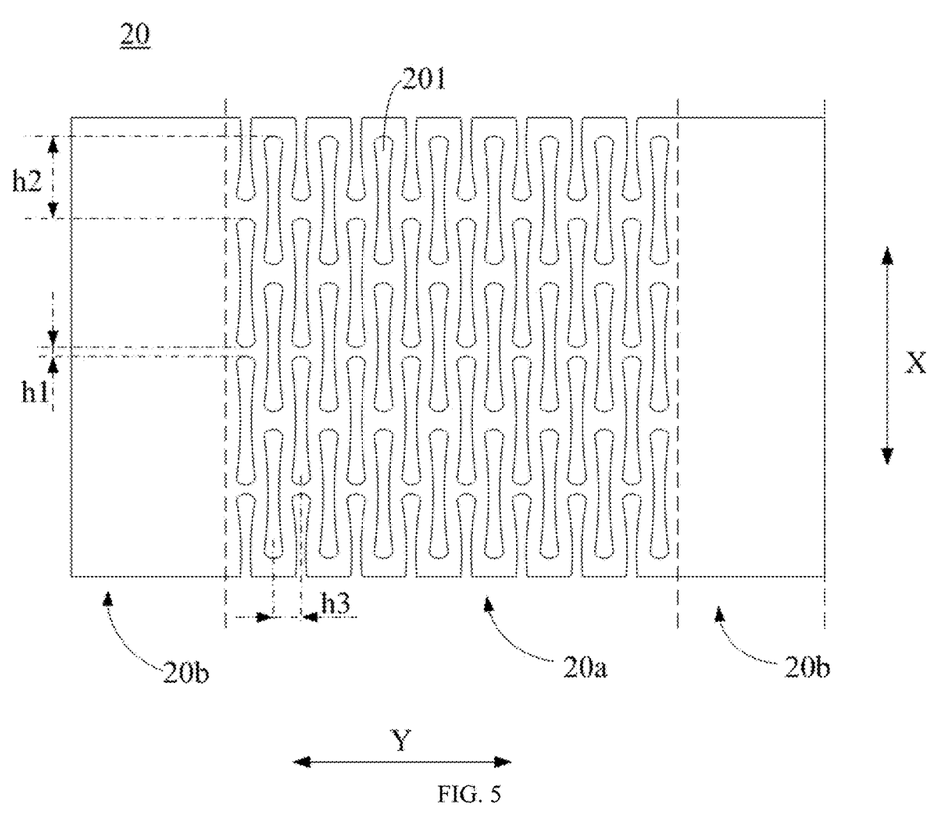
FIG. 5 is a schematic plan view of a supporting backplane according to an embodiment of the disclosure.

In order to improve the above problems, an embodiment of the present disclosure discloses a supporting backplane 20, as shown in FIG. 3, the supporting backplane 20 may be disposed on a side of a flexible display panel 30, for supporting the flexible display panel 30. As shown in FIG. 4 and FIG. 5, the supporting backplane 20 at least includes a main bending area 20a. A bending axis corresponding to the main bending area 20a extends in a first direction X. The main bending area 20a is provided with a plurality of first hollow holes 201. The plurality of first hollow holes 201 are arranged in an array in the first direction X and in a second direction Y. In the embodiment of the present disclosure, according to the negative correlation between the fatigue and maximum stress, by optimizing the pattern of the first hollow hole 201 on the main bending area 20a in the supporting backplane 20, the maximum stress during bending may be reduced without reducing the resilience, and the fatigue resistance performance of the supporting backplane 20 may be improved.

Figure 6:
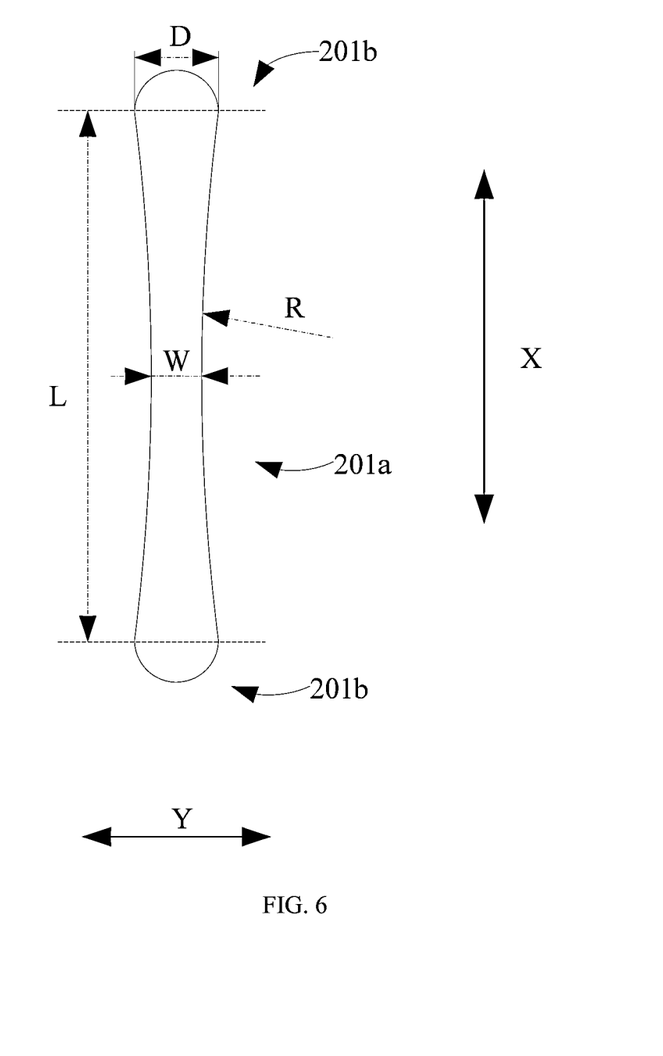
FIG. 6 is a schematic structural diagram of a first hollow hole in a supporting backplane according to an embodiment of the disclosure.

Specifically, the main bending area 20a is provided with a plurality of first hollow holes 201. The plurality of first hollow holes 201 are arranged in an array in the first direction X and in a second direction Y orthogonal to the first direction X. As shown in FIG. 6, each of the first hollow holes 201 has a first middle hole area 201a and first arc-shaped hole areas 201b located at two sides of the first middle hole area 201a in the first direction X. In the embodiment, along a direction from positions where the first middle hole area 201a is connected to the first arc-shaped hole areas 201b to a central position of the first middle hole area 201a, a size of the first middle hole area 201a gradually decreases in the second direction Y. In this way, the first hollow hole 201 can be in the shape of a dumbbell or a dumbbell-like shape as a whole. It should be noted that, the second direction Y mentioned in the embodiments of the present disclosure is orthogonal to the first direction X.

In the embodiment of the present disclosure, as shown in FIG. 5, the adjacent first hollow holes 201 in the second direction Y are arranged in a staggered manner.

Figure 7:
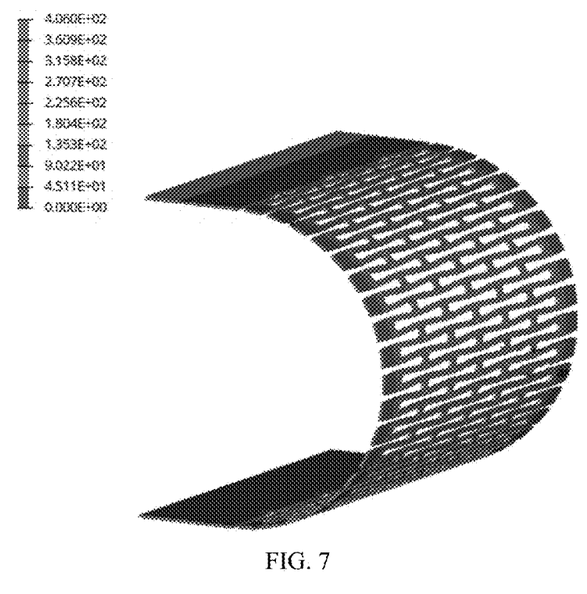
FIG. 7 is a stress cloud diagram of the supporting backplane shown in FIG. 4 when it is bent.

In the embodiment of the present disclosure, the middle area of the first hollow hole 201 gradually shrinks inward, compared with the solution in the related art (as shown in FIG. 1) in which the middle area is a rectangular elongated hole, the stress received during the bending process is decomposed in multiple directions. Therefore, the maximum stress during bending can be reduced, and the fatigue resistance performance of the supporting backplane 20 can be improved. The stress cloud diagram of the supporting backplane 10 in the embodiment of the present disclosure when it is bent is shown in FIG. 7, and the maximum stress is about 406 MPa.

In addition, since the middle areas of the first hollow holes 201 gradually shrink inward and are staggered, during the design process, the first hollow holes 201 arranged in the second direction Y can be made more compact. In other words, such design can make the distance between the adjacent first hollow holes 201 in the second direction Y smaller, for example, it can be reduced by 0.15 mm. Therefore, the number of the first hollow holes 201 per unit area can be increased. Comparing FIG. 1 and FIG. 5, it can be seen that the resilience of the supporting backplane 20 can also be ensured while reducing the maximum bending stress. In an embodiment of the present disclosure, compared with the use of rectangular hollow hole in the related art, the number of the first hollow holes 201 of the supporting backplane 20 of the present disclosure per unit area can be increased by ⅛.

It should be understood that, in order to improve the support performance of the supporting backplane 20, the supporting backplane 20 can be made of a material with a certain thickness and rigidity. For example, the thickness of the supporting backplane 20 can be about 100 μm to 200 μm, for example, 100 μm, 150 μm, 200 μm, etc. The material can be the metal material or alloy material, for example, SUS301 (301 stainless steel), SUS304 (304 stainless steel) and titanium alloy, etc., but not limited to this. Optionally, the supporting backplane 20 may also undergo strengthening treatment. For example, surface strengthening treatment is performed after the patterning operation is completed, so that the surface hardness thereof is greater than HR60. In this way, the wear resistance ability of the supporting backplane 20 can be improved, and the lifespan of the supporting backplane 20 can be improved.

In some embodiments, as can be seen from FIG. 5 and FIG. 6, two opposite contour lines of the first middle hole area 201a in the first hollow hole 201 in the second direction Y are arc-shaped; and the first arc-shaped hole area 201b is a semicircular hole area. This design relieves the stress concentration at the first hollow hole 201, thereby improving the fatigue resistance performance of the supporting backplane 20. In the embodiment, the first hollow hole 201 is symmetrically arranged with respect to its center line in the first direction X. It should be understood that the center of the first middle hole area 201a and the center of the first arc-shaped hole area 201b are located on the same straight line.

Optionally, as shown in FIG. 6, the diameter D of the first arc-shaped hole area 201b is about 0.1 mm to 0.4 mm, for example, 0.1 mm, 0.2 mm, 0.3 mm, 0.4 mm, etc. The size L of the first middle hole area 201a in the first direction X is about 2 mm to 7 mm, for example, 2 mm, 3 mm, 4 mm, 5 mm, 6 mm, 7 mm, etc. A maximum size of the first middle hole area 201a in the second direction Y is identical with the diameter D of the first arc-shaped hole area 201b. A minimum size W of the first middle hole area 201a in the second direction Y is about 0.05 mm to 0.35 mm, for example, 0.05 mm, 0.15 mm, 0.25 mm, 0.3 mm, 0.35 mm, etc. A curvature radius R of the arc-shaped contour line of the first middle hole area 201a is about 10 mm to 50 mm, for example, 10 mm, 20 mm, 30 mm, 40 mm, 50 mm and so on.

Further, a distance h1 between adjacent first hollow holes 201 in the first direction X is 0.05 mm to 0.3 mm, for example, 0.05 mm, 0.15 mm, 0.25 mm, 0.3 mm, etc. A stagger size h2 between the adjacent first hollow holes 201 in the second direction Y is 1 mm to 4 mm, for example, 1 mm, 2 mm, 3 mm, 4 mm, etc. A distance h3 between center lines of the adjacent first hollow holes 201 in the second direction Y is 0.2 mm to 0.5 mm, for example, 0.2 mm, 0.3 mm, 0.4 mm, 0.5 mm, etc.

As shown in FIG. 5, the stagger size h2 mentioned in the embodiment of the present disclosure can be understood as the distance between the same endpoints in the adjacent first hollow holes 201 in the second direction Y. This endpoint refers to the endpoint of the first hollow hole 201 in the first direction X, and the endpoint is located on the center line of the first hollow hole 201 in the first direction X.

It should be noted that, as shown in FIG. 1, the supporting backplane 20 includes not only the main bending area 20a, but also the fixing areas 20b. The fixing areas 20b are located at opposite two sides of the main bending area 20a in the second direction Y. In the embodiment, the main bending area 20a can be bent in the second direction Y. When the main bending area 20a is bent in the second direction Y, the fixing area 20b will not affect the bending effect of the main bending area 20a. It should be understood that the fixing area 20b of the supporting backplane 20 needs to be opposite to the fixing area of the flexible display panel 30. During the bending process of the flexible display panel 30 installed with the supporting backplane 20 in the second direction Y, the fixing area 20b needs to be fixed, so that the main bending area 20a can be bent, or the bending state of the main bending area 20a can be maintained.

In addition, it should also be understood that, in order to ensure the support stability of the supporting backplane 20, the fixing area 20b of the supporting backplane 20 needs to have sufficient rigidity. The rigidity of the fixing area 20b is greater than that of the main bending area 20a. Therefore, in order to make the rigidity of the fixing area 20b sufficiently large, the embodiment of the present disclosure may not perform patterning processing on the fixing area 20b, but it is not limited to this. The fixing area 20b may also be patterned, as long as the rigidity of the fixing area 20b can meet the support performance.

Figure 8:
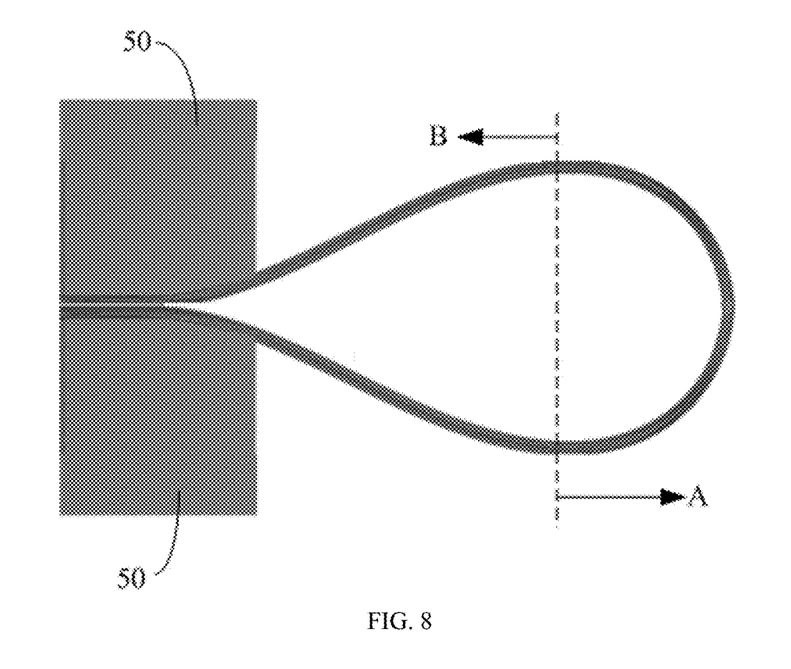
FIG. 8 shows a schematic diagram of the product being bent in a water-drop shape.

During the bending process, the strains at different positions of the supporting backplane 20 are different. For example, as shown in FIG. 8, when the product is bent into a water-drop shape, the area A in the water-drop shaped product is a high strain area, and the area B is a low strain area. It should be noted that the object with the numeral reference 50 in FIG. 8 can be a fixing block. The fixing block 50 can clamp the end of the product, so as to keep the product in a water-drop shaped folded state. In the embodiment, in order to ensure the bendability and resilience ability of the product, the pattern of openings in different strain areas can be designed. Specifically, the bending area of the supporting backplane 20 implemented in the present disclosure not only includes the aforementioned main bending area 20a, but also includes transition bending areas 20c located at opposite two sides of the main bending area 20a in the second direction Y. A plurality of hollow holes are provided on the transition bending area 20c. In the embodiment, a ratio between a total area of the plurality of hollow holes in the transition bending area 20c and a total area of the transition bending area 20c is smaller than a ratio between a total area of the plurality of first hollow holes 201 in the main bending area 20a and a total area of the main bending area 20a. That is, the proportion of openings in the transition bending area 20c is smaller than the proportion of openings in the main bending area 20a, and the rigidity of the transition bending area 20c is greater than that of the main bending area 20a.

In the embodiment of the present disclosure, the main bending area 20a of the supporting backplane 20 may be a high strain area, and the transition bending area 20c may be a low strain area. Therefore, in order to ensure that the main bending area 20a has better bending performance, the proportion of openings on the main bending area 20a may be larger, so that the rigidity of the main bending area 20a is smaller; and in order to ensure that the entire supporting backplane 20 has good resilience, it is necessary to make the proportion of openings on the transition bending area 20c small, so that the rigidity of the transition bending area 20c is relatively large. The bending performance and resilience performance of the entire supporting backplane 20 are balanced through the design of the transition bending area 20c and the main bending area 20a. That is, while ensuring that the entire supporting backplane 20 has good bending performance, it can also have good resilience performance, thereby improving the overall fatigue resistance performance of the supporting backplane 20.

In some embodiments, the plurality of hollow holes in the transition bending area 20c at least include a second hollow hole 202. A plurality of second hollow holes 202 are provided. The plurality of second hollow holes 202 are arranged in an array in the first direction X and the second direction Y. Adjacent second hollow holes 202 in the second direction Y are arranged in a staggered manner. The second hollow hole 202 has a second middle hole area and second arc-shaped hole areas located at two sides of the second middle hole area in the first direction X. By setting the edge area of the second hollow hole 202 in the first direction in a circular arc shape, the problem of stress concentration can be alleviated, thereby ensuring the overall fatigue resistance performance of the supporting backplane 20.

For example, shapes and sizes of the second arc-shaped hole areas of the second hollow hole 202 may be identical with shapes and sizes of the first arc-shaped hole areas 201b of the first hollow hole 201 mentioned above, which will not be repeated here, but not limited to this. The shapes and sizes of the second arc-shaped hole areas in the second hollow hole 202 may also be different from the shapes and sizes of the first arc-shaped hole areas 201b of the first hollow hole 201 mentioned above, depending on the specific situation.

Figure 9:
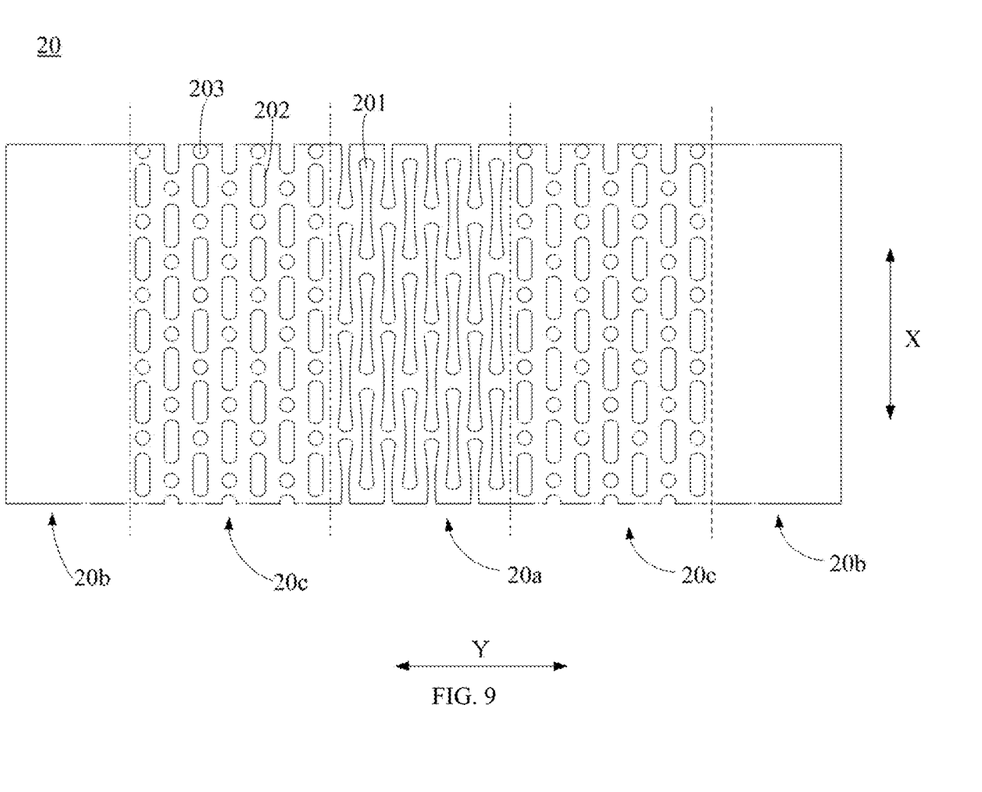
FIG. 9 is a schematic plan view of a supporting backplane according to another embodiment of the disclosure.

In some embodiments, a shape of the second middle hole area in the second hollow hole 202 may be rectangular, as shown in FIG. 9, when the second arc-shaped hole area in the second hollow hole 202 is a semicircular hole area, the size of the second middle hole area in the second hollow hole 202 in the second direction Y may be the same as the diameter of the second arc-shaped hole area. It should be understood that the center of the second middle hole area in the second hollow hole 202 and the center of its second arc-shaped hole area are located on the same straight line.

Figure 10:
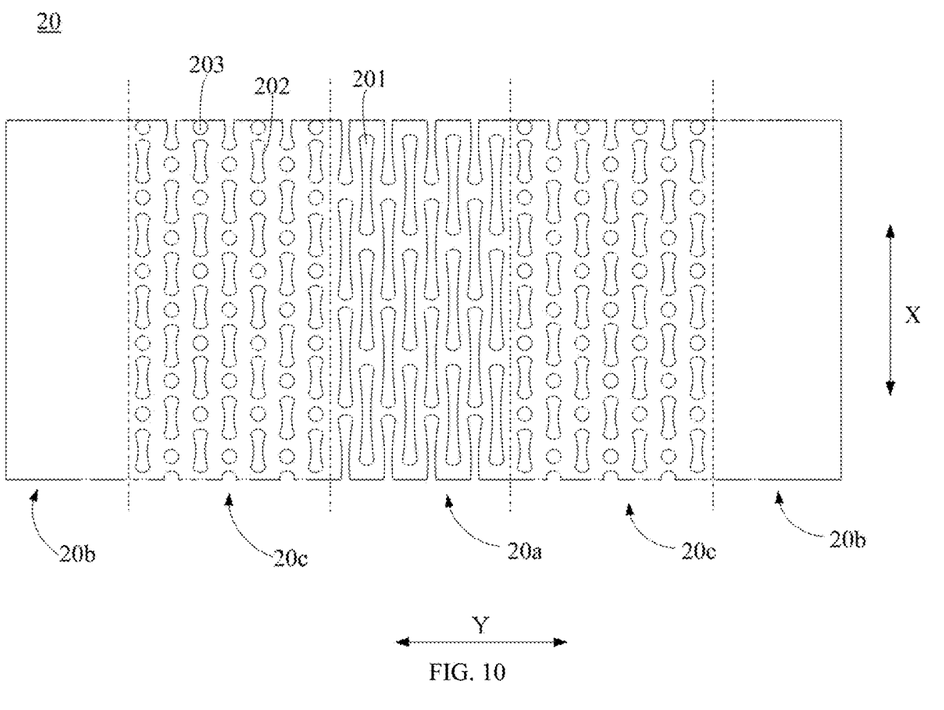
FIG. 10 is a schematic plan view of a supporting backplane according to yet another embodiment of the disclosure.

In other embodiments, two opposite contour lines of the second middle hole area in the second direction Y are arc-shaped. As shown in FIG. 10, the shape of the second hollow hole 202 is similar to the shape of the first hollow hole 201. Further, the arc-shaped contour line can be in the circular arc shape, so as to further alleviate the problem of stress concentration, so as to ensure the fatigue resistance performance of the supporting backplane 20 as a whole. The minimum size of the second middle hole area in the second direction Y may refer to the minimum size of the first middle hole area 201a in the first hollow hole 201 described above.

It should be noted that, as shown in FIGS. 9 and 10, a size of the second middle hole area in the second hollow hole 202 in the first direction X may be smaller than a size of the first middle hole area 201a in the first hollow hole 201 in the first direction X, but not limited to this. The size of the second middle hole area in the first direction X can also be greater than or equal to the size of the first middle hole area 201a in the first direction X. It only needs to ensure that the proportion of openings in the transition bending area 20c is smaller than the proportion of openings in the main bending area 20a.

In some embodiments, as shown in FIG. 9 and FIG. 10, the plurality of hollow holes in the transition bending area 20c may further include a third hollow hole 203. The third hollow hole 203 is located between adjacent second hollow holes 202 in the first direction X. The third hollow hole 203 is a circular hole, and a diameter of the third hollow hole 203 may be identical with a diameter of the first arc-shaped hole area 201b of the first hollow hole 201, but it is not limited to this. They can also be different. It only needs to ensure that the proportion of openings in the transition bending area 20c is smaller than the proportion of openings in the main bending area 20a.

The distance between the second hollow hole 202 and the third hollow hole 203 in the transition bending area 20c in the first direction X can be referred to the distance between the adjacent first hollow holes 201 in the main bending area 20a in the first direction X, which will not be repeated here. The distance between the adjacent second hollow holes 202 or the adjacent third hollow holes 203 in the transition bending area 20c in the second direction Y can be referred to the distance between the adjacent first hollow holes 201 in the main bending area 20a in the second direction Y, which will not be repeated here.

It should be noted that the types of hollow holes in the transition bending area 20c are not limited to these two, and more types may be provided, and the shapes of the second hollow holes 202 and the third hollow holes 203 are not limited to those mentioned in the foregoing embodiments, and may be also other shapes. It only needs to ensure that the proportion of openings in the transition bending area 20c is smaller than the proportion of openings in the main bending area 20a.

In some embodiments, the size of the main bending area 20a in the second direction Y and the size of the transition bending area 20c in the second direction Y may be determined according to the shape and radius of the bending. Specifically, when the supporting backplane 20 is bent into a water-drop shape, the size of the main bending area 20a in the second direction Y and the size of the transition bending area 20c in the second direction Y can be determined according to the bending radius. For example, when the bending radius of the water-drop shaped supporting backplane 20 is 3 mm, the size of the corresponding main bending area 20a in the second direction Y is 9.3 mm to 9.6 mm, for example, 9.3 mm, 9.4 mm, 9.5 mm mm, 9.6 mm, etc. The size of the transition bending area 20c in the second direction Y is 11.4 mm to 11.8 mm, for example, 11.4 mm, 11.5 mm, 11.6 mm, 11.7 mm, 11.8 mm, etc. When the bending radius of the water-drop shaped supporting backplane 20 is 4 mm, the size of the corresponding main bending area 20a in the second direction Y is 12.4 mm to 12.7 mm, for example, 12.4 mm, 12.5 mm, 12.6 mm, 12.7 mm, etc. The size of the transition bending area 20c in the second direction Y is 15.2 mm to 15.6 mm, for example, 15.2 mm, 15.3 mm, 15.4 mm, 15.5 mm, 15.6 mm and so on.

An embodiment of the present disclosure further provides a display apparatus, as shown in FIG. 3, which may include a flexible display panel 30 and the supporting backplane 20 described in any of the foregoing embodiments. The supporting backplane 20 is disposed on a side of the flexible display panel 30. For example, the flexible display panel 30 can be an OLED (Organic Light-Emitting Diode) display.

In some embodiments, the display apparatus may further include a buffer rubber layer 40, which is adhered between the supporting backplane 20 and the flexible display panel 30. In the embodiment of the present disclosure, by setting the buffer rubber layer 40, it can achieve the adhesion between the supporting backplane 20 and the flexible display panel 30, at the same time, it can also play an effect of absorbing dislocation and buffering.

Optionally, the buffer rubber layer 40 can be a foam rubber layer. That is, the buffer rubber layer 40 is made of foam rubber, which can improve the buffer performance and the deformation recovery performance of the buffer rubber layer 40. In addition, the problem of stamping in the process of laminating the supporting backplane 20 and the flexible display panel 30 can also be solved, and the resilience and flatness of the display apparatus may also be enhanced.

Optionally, the thickness of the buffer rubber layer 40 may be 100 μm to 200 μm, for example, 100 μm, 120 μm, 140 μm, 160 μm, 180 μm, 200 μm and so on.

In the embodiments of the present disclosure, the specific type of the display apparatus is not particularly limited, and any type of display apparatus commonly used in the art can be used, such as OLED displays, mobile devices such as mobile phones, wearable devices such as watches, VR (Virtual Reality) devices, etc. Those skilled in the art can make corresponding selection according to the specific use of the display apparatus, which will not be repeated here.

It should be noted that, in addition to the flexible display panel 30 and the supporting backplane 20, the display apparatus also includes other necessary parts and components, for example, a display, specifically, for example, a casing, a circuit board, a power cord, etc. Those skilled in the art may make corresponding supplement according to the specific usage requirements of the display apparatus, which will not be repeated here.

The technical solutions provided by the present disclosure can achieve the following beneficial effects.

In the supporting backplane and the display apparatus provided by the present disclosure, since the middle area of the first hollow hole gradually shrinks inward, compared with the solution in the related art in which the middle area is a rectangular elongated hole, the stress received during the bending process is decomposed in multiple directions, therefore, the maximum stress during bending can be reduced, and the fatigue resistance performance of the supporting backplane can be improved.

In addition, since the middle area of the first hollow hole gradually shrinks inward, the first hollow holes arranged in the second direction can be made more compact in the design, so that the number of the first hollow holes per unit area can be increased. In this way, the maximum bending stress can be reduced, and the resilience of the supporting backplane can also be guaranteed.

Other embodiments of the present disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or conventional technical means in the technical field not disclosed by this disclosure. The specification and embodiments are to be regarded as exemplary only, with the true scope and spirit of the disclosure being indicated by the appended claims.

What is claimed is:

1. A supporting backplane, disposed on a side of a flexible display panel, the supporting backplane at least comprising a main bending area, and a bending axis corresponding to the main bending area extending in a first direction; and the main bending area being provided with a plurality of first hollow holes, and the plurality of first hollow holes being arranged in an array in the first direction and in a second direction orthogonal to the first direction; and each of the first hollow holes having a first middle hole area and first arc-shaped hole areas located at two sides of the first middle hole area in the first direction;

wherein, along a direction from positions where the first middle hole area is connected to the first arc-shaped hole areas to a central position of the first middle hole area, a size of the first middle hole area gradually decreases in the second direction, wherein a diameter of the first arc-shaped hole area is 0.1 mm to 0.4 mm;

a size of the first middle hole area in the first direction is 2 mm to 7 mm, a maximum size of the first middle hole area in the second direction is identical with the diameter of the first arc-shaped hole area, a minimum size of the first middle hole area in the second direction is 0.05 mm to 0.35 mm, and a curvature radius of the arc-shaped contour line of the first middle hole area is 10 mm to 50 mm.

2. The supporting backplane according to claim 1, wherein two opposite contour lines of the first middle hole area in the second direction are arc-shaped; and the first arc-shaped hole area is a semicircular hole area;

wherein, the first hollow hole is symmetrically arranged with respect to its center line in the first direction.

3. The supporting backplane according to claim 2, wherein adjacent first hollow holes in the second direction are arranged in a staggered manner.

4. The supporting backplane according to claim 1, wherein, a distance between adjacent first hollow holes in the first direction is 0.05 mm to 0.3 mm;

a stagger size between the adjacent first hollow holes in the second direction is 1 mm to 4 mm;

a distance between center lines of the adjacent first hollow holes in the second direction is 0.2 mm to 0.5 mm.

5. The supporting backplane according to claim 2, wherein the supporting backplane further comprises transition bending areas located at opposite two sides of the main bending area in the second direction, the transition bending area is provided with a plurality of hollow holes;

wherein, a ratio between a total area of the plurality of hollow holes in the transition bending area and a total area of the transition bending area is smaller than a ratio between a total area of the plurality of first hollow holes in the main bending area and a total area of the main bending area.

6. The supporting backplane according to claim 5, wherein the plurality of hollow holes in the transition bending area at least comprise a second hollow hole, a plurality of the second hollow holes are provided, the plurality of second hollow holes are arranged in an array in the first direction and the second direction, and adjacent second hollow holes in the second direction are arranged in a staggered manner;

wherein, the second hollow hole has a second middle hole area and second arc-shaped hole areas located at two sides of the second middle hole area in the first direction; shapes and sizes of the second arc-shaped hole areas are identical with shapes and sizes of the first arc-shaped hole areas; a shape of the second middle hole area is rectangular, or two opposite contour lines of the second middle hole area in the second direction are arc-shaped; and a size of the second middle hole area in the first direction is smaller than a size of the first middle hole area in the first direction.

7. The supporting backplane according to claim 6, wherein the plurality of hollow holes in the transition bending area further comprise a third hollow hole, and the third hollow hole is located between adjacent second hollow holes in the first direction, wherein the third hollow hole is a circular hole, and a diameter of the third hollow hole is identical with a diameter of the first arc-shaped hole area.

8. A display apparatus comprising: a flexible display panel and a supporting backplane, wherein the supporting backplane is disposed on a side of the flexible display panel, the supporting backplane at least comprises a main bending area, and a bending axis corresponding to the main bending area extends in a first direction; and the main bending area is provided with a plurality of first hollow holes, and the plurality of first hollow holes are arranged in an array in the first direction and in a second direction orthogonal to the first direction; and each of the first hollow holes has a first middle hole area and first arc-shaped hole areas located at two sides of the first middle hole area in the first direction;

wherein, along a direction from positions where the first middle hole area is connected to the first arc-shaped hole areas to a central position of the first middle hole area, a size of the first middle hole area gradually decreases in the second direction, wherein a diameter of the first arc-shaped hole area is 0.1 mm to 0.4 mm;

a size of the first middle hole area in the first direction is 2 mm to 7 mm, a maximum size of the first middle hole area in the second direction is identical with the diameter of the first arc-shaped hole area, a minimum size of the first middle hole area in the second direction is 0.05 mm to 0.35 mm, and a curvature radius of the arc-shaped contour line of the first middle hole area is 10 mm to 50 mm.

9. The display apparatus according to claim 8, further comprising a foam rubber layer, wherein the foam rubber layer is adhered between the supporting backplane and the flexible display panel.

10. The display apparatus according to claim 8, wherein two opposite contour lines of the first middle hole area in the second direction are arc-shaped; and the first arc-shaped hole area is a semicircular hole area;

wherein, the first hollow hole is symmetrically arranged with respect to its center line in the first direction.

11. The display apparatus according to claim 10, wherein adjacent first hollow holes in the second direction are arranged in a staggered manner.

12. The display apparatus according to claim 8, wherein,
a distance between adjacent first hollow holes in the first direction is 0.05 mm to 0.3 mm;
a stagger size between the adjacent first hollow holes in the second direction is 1 mm to 4 mm;
a distance between center lines of the adjacent first hollow holes in the second direction is 0.2 mm to 0.5 mm.

13. The display apparatus according to claim 10, wherein the supporting backplane further comprises transition bending areas located at opposite two sides of the main bending area in the second direction, the transition bending area is provided with a plurality of hollow holes;

wherein, a ratio between a total area of the plurality of hollow holes in the transition bending area and a total area of the transition bending area is smaller than a ratio between a total area of the plurality of first hollow holes in the main bending area and a total area of the main bending area.

14. The display apparatus according to claim 13, wherein the plurality of hollow holes in the transition bending area at least comprise a second hollow hole, a plurality of the second hollow holes are provided, the plurality of second hollow holes are arranged in an array in the first direction and the second direction, and adjacent second hollow holes in the second direction are arranged in a staggered manner;

wherein, the second hollow hole has a second middle hole area and second arc-shaped hole areas located at two sides of the second middle hole area in the first direction; shapes and sizes of the second arc-shaped hole areas are identical with shapes and sizes of the first arc-shaped hole areas; a shape of the second middle hole area is rectangular, or two opposite contour lines of the second middle hole area in the second direction are arc-shaped; and a size of the second middle hole area in the first direction is smaller than a size of the first middle hole area in the first direction.

15. The display apparatus according to claim 14, wherein the plurality of hollow holes in the transition bending area further comprise a third hollow hole, and the third hollow hole is located between adjacent second hollow holes in the first direction, wherein the third hollow hole is a circular hole, and a diameter of the third hollow hole is identical with a diameter of the first arc-shaped hole area.

\* \* \* \* \*

UNITED STATES PATENT AND TRADEMARK OFFICE
CERTIFICATE OF CORRECTION

| | | |
|---|---|---|
| PATENT NO. | : 12,080,197 B2 | Page 1 of 1 |
| APPLICATION NO. | : 17/763398 | |
| DATED | : September 3, 2024 | |
| INVENTOR(S) | : Chen et al. | |

It is certified that error appears in the above-identified patent and that said Letters Patent is hereby corrected as shown below:

On the Title Page

Item (73), Please correct the name of the 1st Assignee to read as follows:
CHENGDU BOE OPTOELECTRONICS TECHNOLOGY CO., LTD., Sichuan (CN)

Signed and Sealed this
Ninth Day of September, 2025

Coke Morgan Stewart
*Acting Director of the United States Patent and Trademark Office*